(12) United States Patent
Upreti

(10) Patent No.: US 10,992,133 B1
(45) Date of Patent: Apr. 27, 2021

(54) SYNCHRONIZATION VERIFICATION SYSTEM USING REMOTELY MANAGED TIME

(71) Applicant: Schweitzer Engineering Laboratories, Inc., Pullman, WA (US)

(72) Inventor: Ashish Upreti, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/661,189

(22) Filed: Oct. 23, 2019

(51) Int. Cl.
*H02J 3/08* (2006.01)
*G06F 1/12* (2006.01)
*H02J 13/00* (2006.01)

(52) U.S. Cl.
CPC .................. *H02J 3/08* (2013.01); *G06F 1/12* (2013.01); *H02J 13/0017* (2013.01)

(58) Field of Classification Search
CPC ........................................................ H02J 3/08
USPC ............................................................ 307/43
See application file for complete search history.

(56) References Cited

U.S. PATENT DOCUMENTS

| 2,817,024 A | 12/1957 | Karlicek |
| 7,230,809 B2 | 6/2007 | Whitehead |
| 2005/0280966 A1* | 12/2005 | Whitehead ................ H02J 3/42 361/81 |
| 2013/0096854 A1* | 4/2013 | Schweitzer, III .... G01R 31/085 702/59 |
| 2018/0348267 A1 | 12/2018 | Yang |

OTHER PUBLICATIONS

S. Manoharan, et al. "Grid Synchronication by Estimation of Positive Sequence Component in Three Phase Signals", International Journal of Innovative Research in Science, Engineering and Technology, vol. 3, Special Issue 3, Mar. 2014.
Adrian Vasile Timbus "Grid Monitoring and Advanced Control of Distributed Power Generation Systems" Aalborg: Institut for Energiteknik, Aalborg Universitet. May 2007.

* cited by examiner

*Primary Examiner* — Joseph Chang
(74) *Attorney, Agent, or Firm* — Fletcher Yoder, P.C.

(57) ABSTRACT

Systems and methods may be used to determine whether waveforms of at least two transmission lines are synchronous. More particularly, this disclosure relates to sensing operations that use signals received by a local relay and a remote relay to determine whether two waveforms on opposing ends (e.g., supply side and load side, local side and remote side) of a transmission line are synchronous with one another. A system may determine whether a first waveform is synchronous with a second waveform based at least in part on a comparison of delay between a representation of the first waveform and a representation of the second waveform. The system may actuate a device (e.g., close a circuit breaker) in response to determining the first waveform is synchronous with the second waveform.

19 Claims, 6 Drawing Sheets

SYNCHRONIZATION VERIFICATION SYSTEM USING REMOTELY MANAGED TIME

BACKGROUND

This disclosure relates to sensing operations of a power transmission system. More particularly, this disclosure relates to synchronization systems that determine a time period (e.g., synchronization window) during which to close a relay or circuit breaker based at least in part on one or more remotely managed time, timing signal, or clocking signal (e.g., clock signals).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery systems are widely used to generate and distribute electric power to loads. While some systems (or portions of systems) operate in direct current (DC), many electric power delivery systems operate (or have portions that operate) in alternating current (AC). In AC systems, the power flowing through the conductors and other power system equipment is from current waveforms and voltage waveforms alternating between high and low peaks in a generally sinusoidal fashion (e.g., sinusoidal voltage signal). The frequency of the alternating waveforms are a key power system measurement for frequency control and frequency protection and for many other monitoring and protection functions, such as, frequency measurement operations, load shedding operations, overexcitation protection operations, synchrophasor measurement operations, switching operations, bus transfer operations, and so on. Without an accurate measurement of the electric power delivery system frequency, it may be difficult to properly monitor and protect the electric power delivery system from faults or other misoperations.

DETAILED DESCRIPTION

Figure 1:
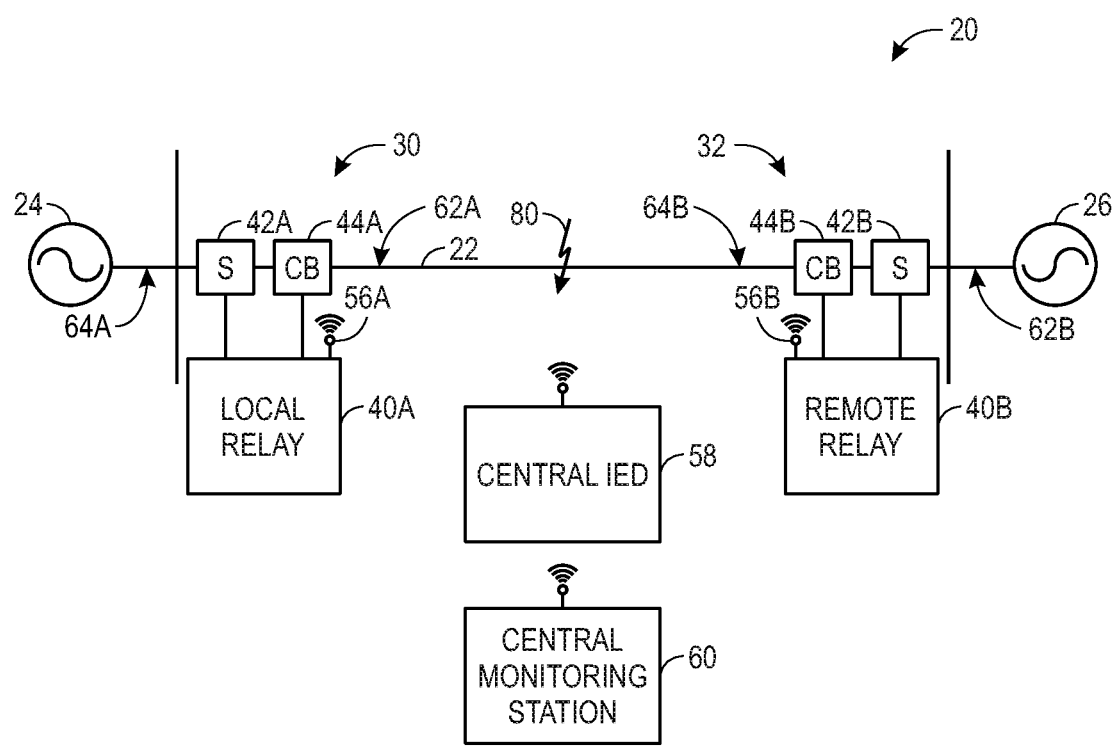
FIG. 1 is a block diagram of an embodiment of a power delivery (e.g., transmission) system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Electric power delivery systems may generate and distribute electric power to loads. In some electric power delivery systems, at least a portion of the electric power delivery system operates in direct current (DC). However, many electric power delivery systems operate at least partially in alternating current (AC). In AC systems, operations of the electric power delivery system are sometimes based on a frequency of the waveforms generated and/or distributed via the electric power delivery system. These operations may include, for example, frequency control operations, frequency protection operations, load shedding operations, overexcitation protection operations, synchrophasor measurement operations, switching operations, bus transfer operations, or the like. Accordingly, accurate measurement of electric power delivery system frequency may be useful for proper monitoring and protection of the power system.

For example, a relay may use a measurement of an electric power delivery system frequency when determining when to close a circuit breaker, such as during a synchronization operation. In a synchronization operation, buses that are each transporting separate electrical power waveforms may not be connected to one another (by closing the circuit breaker) until the electrical power waveforms have sufficiently similar characteristics to enable uninterrupted (e.g., desirable) sharing of electrical power. In this way, the synchronization operations may monitor when two electrical power signal frequencies or other related characteristics of the electrical power waveforms are within a threshold value of each other before connecting the buses via closing of the circuit breaker.

Since voltage waveforms and/or current waveforms of the electric power delivery system are periodic, frequency may be measured using the period of the waveform. For example, a frequency may be determined by measuring a time between consecutive high peaks, a time between consecutive low peaks, a time between rising zero crossings, a time between falling zero crossings, or the like. Moreover, although perfect waveforms are periodic in steady state, power systems are in a constant state of fluctuation. In a functioning power system, voltages and currents are not precisely periodic, and thus the frequency may vary within periods. A system able to determine when to connect the buses in a more efficient or improved manner (e.g., with fewer sensors or with simpler connections) may be generally desired to improve operation of the electric power delivery system.

As described below, an example electric power delivery system may use electrical power signals measured by a first relay (e.g., local relay) at a first circuit breaker (e.g., a local circuit breaker) to determine when to close the circuit breaker. The first relay may use the measured electrical power signals in combination with one or more additional electrical power signals measured by a second relay (e.g., a remote relay) at a second circuit breaker (e.g., remote circuit breaker). In doing this, the electric power delivery system may reduce a number of sensing devices (e.g., current or voltage transformers) that sense waveforms associated with the electrical power signals used to determine when to actuate the circuit breaker. For example, in doing this, the electric power delivery system may reduce a number of voltage transformers used to determine when a zero degree close (e.g., closing the circuit breaker when two waveforms on opposite sides of the circuit breaker are in phase) may be performed to connect (e.g., join) two power transmission lines transmitting different waveforms.

Keeping this in mind, an electric power delivery system may include a first circuit breaker (associated with a first potential transformer and a first relay) coupled to a second circuit breaker (associated with a second potential transformer and a second relay) via a power transmission line that has an impedance (e.g., an impedance from materials used to form the power transmission line). For ease of discussion, one of the circuit breakers may be defined as a local circuit breaker, and the other circuit breaker may be defined as a remote circuit breaker. In this case, the first circuit breaker is referred to as the local circuit breaker, while the second circuit breaker is referred to as the remote circuit breaker. However it should be understood that in an actual operation, these labels are interchangeable as long as definitions and subsequent control operations are consistent. The first circuit breaker, or local circuit breaker, and the second circuit breaker, or remote circuit breaker, may share electrical waveforms (e.g., voltages, currents) while both circuit breakers are closed. Once one circuit breaker is operated open, the electrical waveforms transmitted between a supply and a supply side of the open circuit breaker are independent of electrical waveforms transmitted between a load side of the open circuit breaker and the closed circuit breaker (ultimately to a load of the closed circuit breaker).

In this way, synchronous operations may be used to determine when to close an open circuit breaker. These operations may analyze a frequency of the electrical waveforms on a supply side of the open circuit breaker (e.g., input side) and on a load side of the open circuit breaker (e.g., output side) to determine when the waveforms are suitably similar, and thus when the opened circuit breaker may be suitably closed. Measuring this frequency may use fewer potential transformers when, using as an example the local circuit breaker (e.g., first circuit breaker) as the open circuit breaker, measurements made at the remote circuit breaker are leveraged to determine when to close the local circuit breaker. To use these measurements, sensed data from the remote circuit breaker may be adjusted to compensate for transmission delays associated with transmitting electrical waveforms via the transmission line such that the sensed data becomes indicative of electrical waveforms at a load side of the local circuit breaker that is open. Compensating for the transmission delays may make the comparison between the electrical waveforms a "fair" comparison. Comparing the unbiased waveforms (e.g., waveforms compensated for at least some transmission delays) sensed at the remote relay to the waveforms sensed at the local relay may permit the local relay to determine when electrical waveforms of the load side of the local circuit breaker are synchronous with waveforms of the supply side of the local circuit breaker, and thus when the local circuit breaker may be operated closed.

Making the measurements in this manner may provide the particular advantage of being able to monitor three phrases simultaneously rather than monitoring one phase. For example, system frequency, voltage, and positive sequence angle difference across a circuit breaker may be monitored using the systems and methods described herein.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, or the like, and which performs one or more tasks or implements particular abstract data types.

In certain embodiments, a particular software module or component may include disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

FIG. 1 is a block diagram of a power delivery system 20 (e.g., electric power delivery system) that may be adapted to use the systems and methods described above to verify a synchronization operation based on a remotely managed time, broadcasted to the power delivery system 20 and, sometimes, transformed into a clocking signal (e.g., clock signal). The power delivery system 20 may be any suitable power delivery system 20, such as a three-phase power delivery system. Although a one-line block diagram is used as a simplified example, the systems and methods discussed herein may be used in conjunction with any suitable electric power delivery system, such as a power transmission system, a power distribution system, radial power distribution systems, bi-directional power systems, or the like.

The power delivery system 20 may generate, transmit, and distribute electric energy to loads. The power delivery system 20 may include various types of equipment, such as electric generators, power transformers, power transmission and/or delivery lines, circuit breakers, busses, loads, and the like. A variety of other types of equipment may also be included in power delivery system 20, such as voltage regulators, capacitor banks, and the like. Furthermore, the system and methods disclosed herein may additionally or alternatively be used with loads as well, such as to determine a frequency of a voltage supplied to a load without considering a frequency of the system as a whole.

In the depicted example, the power delivery system 20 includes a power line 22 (e.g., a transmission line) that transfers electrical energy from a first power generator 24 (e.g., local power generator) and a second power generator 26 (e.g., remote power generator) to one or more loads. The power delivery system 20 may be monitored, controlled, automated, and/or protected using protection systems 30 and 32. The protection systems 30 and 32 may each include one or more intelligent electronic devices (IEDs), such as a local relay 40A and a remote relay 40B. For example, the IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment. Note that, as used herein, the local relay 40A may refer to a relay that determines a location of a fault as a distance from that relay. Further, the remote relay 40B may refer to a relay that transmits data (e.g., current measurements and voltage measurements) used by the local relay in determining the location of the fault. That is, the remote relay 40B may be any suitable distance from the local relay 40.

As used herein, an intelligent electronic device (IED) (e.g., local relay 40A, remote relay 40B) may refer to any circuitry- and/or microprocessor-based device that monitors, controls, automates, and/or protects monitored equipment within the power delivery system 20. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system that includes multiple IEDs. Some IEDs may include additional circuitry for performing sensing operations or otherwise generating data for use during operation. For example, a relay (e.g., an IED) may include a phasor measurement unit (PMU) to sense a magnitude and phase of the power delivery system 20.

A common time signal may be distributed throughout the power delivery system 20. Utilizing a common or universal time source may enable the IEDs to generate time-synchronized data. In some examples, relays 40A and 40B may receive the common time signal. The common time signal may be distributed in the power delivery system 20 using a communications network or using a common time source, such as a Global Navigation Satellite System (GNSS), Global Positioning System (GPS), or the like.

The local relay 40A and the remote relay 40B may use communication circuitries 56A, 56B to communicate with each other, with one or more other IEDs 58, and/or with a central monitoring station 60. The local relay 40A and the remote relay 40B may communicate with the IED 58 and/or the central monitoring station 60 directly or via a communication network. The central monitoring station 60 may include one or more of a variety of types of systems. For example, central monitoring station 60 may include a supervisory control and data acquisition (SCADA) system and/or a wide area control and situational awareness (WACSA) system. The local relay 40A and the remote relay 40B may communicate over various media such as direct communication or over a wide-area communications network. In some embodiments, the local relay 40A and the remote relay 40B may communicate with each other via a wired connection (e.g., fiber optic connection, coaxial connection).

Network communication may be facilitated by networking devices including, but not limited to, multiplexers, access points, routers, hubs, gateways, firewalls, and switches. In some examples, IEDs and network devices may include physically distinct devices. Sometimes, IEDs and network devices may be composite devices, or may be configured in a variety of ways to perform overlapping functions IEDs and network devices may include multi-function hardware (e.g., processors, computer-readable storage media, communications interfaces, or the like) that may be utilized to perform a variety of tasks that pertain to network communications and/or to equipment operations within the power delivery system 20.

As explained below, the local relay 40A and/or the remote relay 40B may monitor the electrical characteristics of power on the power line 22 via sensor circuitry 42A, 42B. Each of the local relay 40A and the remote relay 40B may communicatively couple to a respective circuit breaker 44A, 44B. Upon occurrence of a fault 80, the local relay 40A, the remote relay 40B, the other IED 58, and/or the central monitoring station 60, may adjust or perform a control operation on the power delivery system 20, such as opening the local circuit breaker 44A or opening the remote circuit breaker 44B. Furthermore, the relays 40, in determining to open the circuit breaker 44, may use synchronization operations to determine when electrical signals on a load side 62 of the circuit breaker 44 are synchronous with electrical signals on a supply side 64 of the circuit breaker 44. These synchronization operations may use delay-compensated measurements associated with the remote circuit breaker 44B to determine whether a supply side 64A of the local circuit breaker 44A is synchronous with a load side 62A of the local circuit breaker. As a consequence, less circuitry may be installed to obtain measurements used for synchronization operations (e.g., local sensing circuitry on the supply side of the local circuit breaker 44A may be avoided since supply-side measurements can instead be obtained using the delay-compensated measurements).

Figure 2:
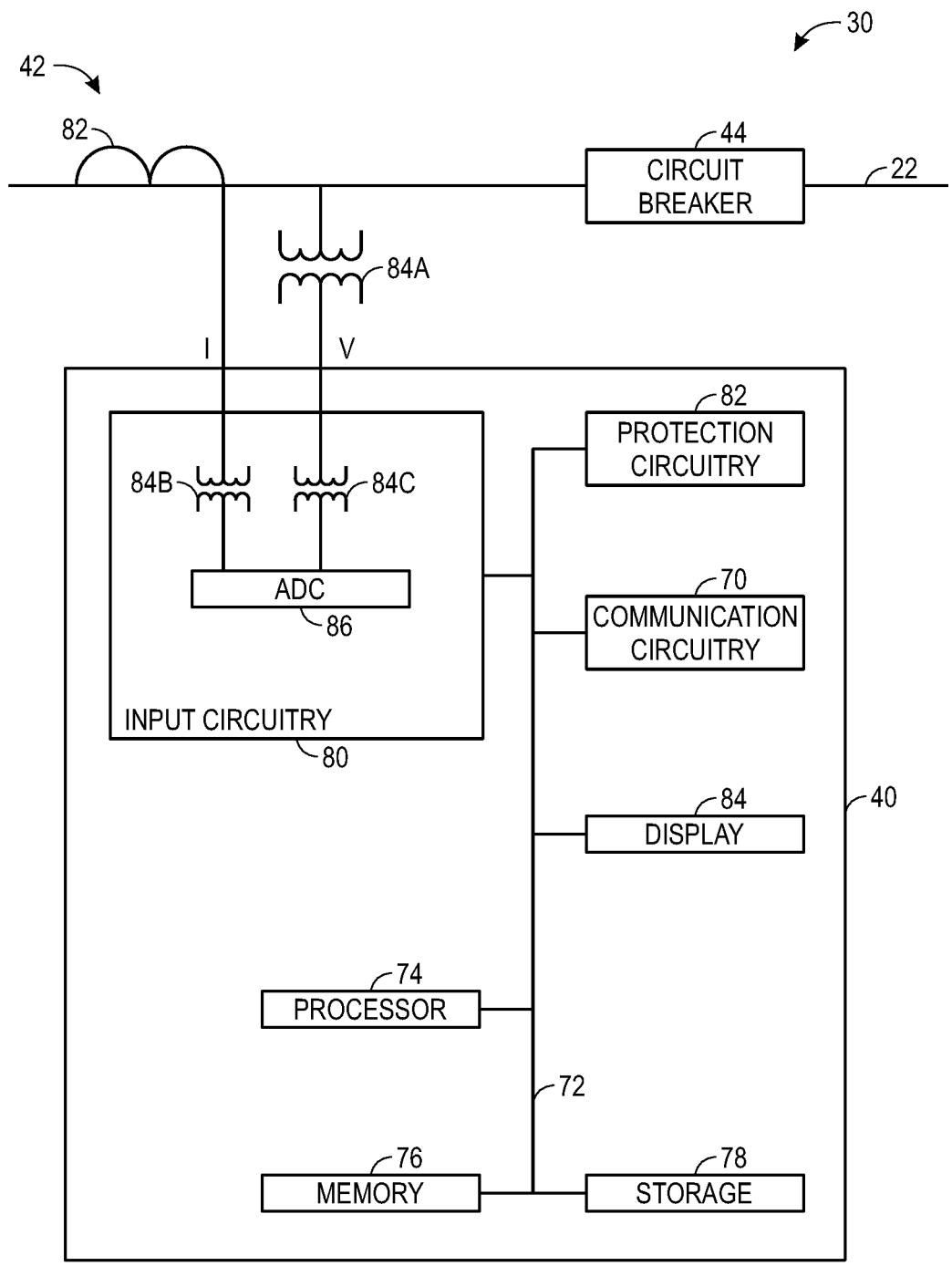
FIG. 2 is a block diagram of a protection system of the power delivery system of FIG. 1, in accordance with an embodiment.

FIG. 2 is a block diagram of the protection system 30 that may be used to determine a location of a fault, determine a frequency of a voltage, adjust a control operation on the power delivery system 20, or the like. The protection system 30 includes the local relay 40A, the sensor circuitry 42A, and the circuit breaker 44. The local relay 40A may include a bus 72 coupling a processor 74 or processing unit(s) to a memory 76, a computer-readable storage medium (e.g., storage 78), input circuitry 80, protection circuitry 82, and one or more displays 84. In some embodiments, the processor 74 may include two or more processors. The storage 78 may include and/or interface with software, hardware, and/or firmware modules for implementing various portions of the systems and methods described herein. The storage 78 may be the repository of one or more modules and/or executable instructions to implement any of the processes described herein. Sometimes, the storage 78 and the modules therein may all be implemented as hardware components, such as via discrete electrical components, via a Field Programmable Gate Array (FPGA), and/or via one or more Application Specific Integrated Circuits (ASICs).

The processor 74 may process inputs received via the input circuitry 80 and/or the communication circuitry 56. The processor 74 may operate using any number of processing rates and architectures. The processor 74 may perform various algorithms and calculations described herein using computer-executable instructions stored within the storage 78. In some cases, the processor 74 may be embodied as a microprocessor, a general purpose integrated circuit, an application-specific integrated circuit (ASIC), a field programmable gate array (FPGA), and/or other programmable logic devices.

The sensor circuitry 42 may each include a current transformer 82 and/or a voltage (e.g., potential) transformer 84A. The input circuitry 80 may receive electric current waveforms and/or voltage waveforms from the current transformer 82 and the voltage transformer 84A respectively, transform the signals using respective potential transformer(s) 84B, 84C to a level that may be sampled, and sample the signals to produce digital signals representative of measured current and measured voltage on the power line. The input circuitry 80 may use analog-to-digital (A/D) converter(s) 86 to perform the sampling. Similar values may also be received from other distributed controllers, station controllers, regional controllers, or centralized controllers. The values may be in an analog and/or digital format.

In certain cases, the input circuitry 80 may monitor current signals associated with a portion of a power delivery system 20. Further, the input circuitry 80 may monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, conductor sag, and the like.

The A/D converter 86 may be connected to the processor 74 by way of the bus 72, through which digitized representations of current and voltage waveforms may be transmitted to the processor 74. As described above, the processor 74 may be used to monitor and/or protect portions of the power delivery system 20, and issue control instructions in response to the same (e.g., instructions implementing protective actions). For example, the processor 74 may determine a location of a fault on the power line 22 based on the digitized representations of the current and/or voltage waveforms.

In response to detecting a fault or otherwise abnormal behavior, the processor 74 may toggle a control operation of the power delivery system 20 via the protection circuitry 82. For example, the processor 74 may send a signal to control operation of the circuit breaker 44, such as to disconnect the power line 22 from the first power generator 24. The local relay 40A may include the display 84 to display alarms indicating the location of the fault to an operator. The communication circuitry 70 may include a transceiver to communicate with one or more other intelligent electronic devices and/or a central monitoring station, or the like. In some examples, the processor 74 may cause the transceiver to send a signal indicating the location of the fault. For example, the processor 74 may send, via the transceiver of the communication circuitry 70, a signal indicating the location of the fault to the central monitoring station 60. Further, the processor 74 may activate the alarms upon detection of the fault.

Figure 3:
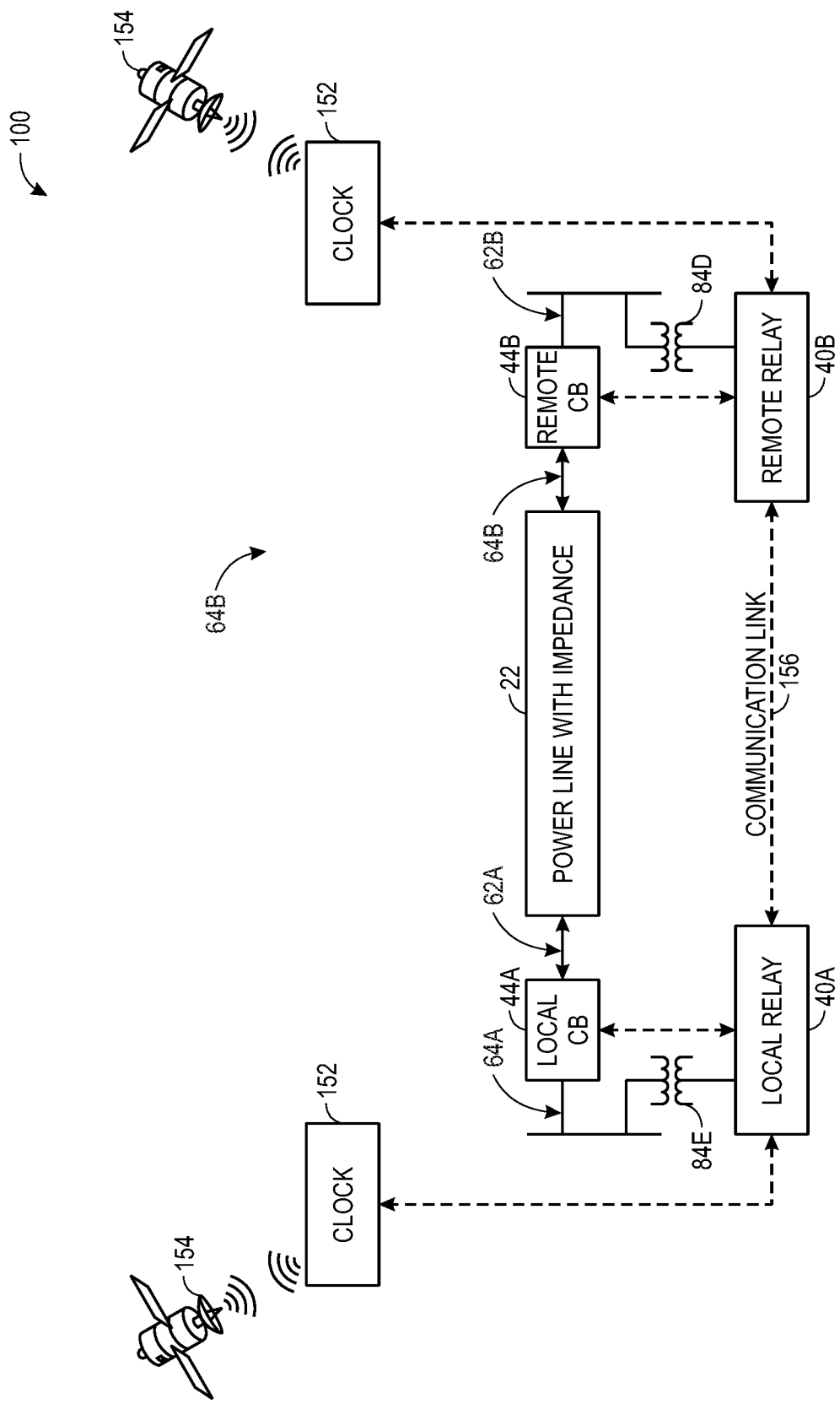
FIG. 3 is a block diagram of a synchrophasor-based synchronization system of the power delivery system of FIG. 1, in accordance with an embodiment.

FIG. 3 is a block diagram of a synchronization system 150 of the power delivery system of FIG. 1. The synchronization system 150 includes a local relay 40A and a remote relay 40B. In some cases, the local relay 40A and the remote relay 40B are of a same or similar relay model and/or design, however it should be understood that this is not always the case and any suitable combination of relays may be used. As described above each of the relays 40 may include processing circuitry, communication circuitry, and/or other components that facilitate determining when to actuate the relay 40 to cause the closing, or opening, of the circuit breaker 44.

The synchronization system 150 includes a potential transformer 84E, 84D for each relay 40. In some synchronization systems 150, there may be two potential transformers 84 for each relay 40. Indeed, in other synchronization systems, there may be a higher or different number of potential transformers 84 each used when determining to actuate the relay. The synchronization system 150 may have a reduced number of current transformers 82 used when determining to actuate the relay 40 because the determination of the synchronization system 150 may use measured voltages from the remote relay 40B instead of any additional voltages measured by the local relay 40A using additional transformer or measurement circuitry. Since the measurement uses voltages measured by the remote relay 40B, the additional current transformer circuitry that may have been associated with the local relay 40A is excluded from the synchronization system 150.

To help explain operation, the local relay 40A may measure a voltage associated with local circuit breaker 44A. The local relay 40A may then use an impedance of the power line 22, the measured voltage, and a determined delay between the local circuit breaker 44A and the remote circuit breaker 44B to determine when to control operation of the circuit breaker 44A (e.g., as part of a transmission line impedance determination operation). The impedance of the power line 22 may be a known value and/or or a value determined based on one or more sensed waveforms of the power line 22. One or more additional electrical power signal measurements, such as an additional voltage measurement performed by the remote relay 40B, may also be used by the local relay 40 to determine when to control the circuit breaker 44A. Determining the delay caused by transmission latencies of the power line 22 may be facilitated via time-synchronized clocks 152 received by each respective relay 40. Remote clock management systems 154 may broadcast time information of the present time. The remote clock management systems 154 may include any suitable clock generation (or tracking) circuitry (or devices) that provides a common time signal, such as a GNSS satellite (e.g., a global position system (GPS), GLONASS, etc.). In this way, the time-synchronized clocks 152 may be associated with and/or based on a common time signal that is common between each of the time-synchronized clocks 152 to allow the relays 40A and 40B to align measurements according to a common time domain. Electrical measurements of the remote relay 40B and the associated time stamps, from the time-synchronized clocks 152 may be communicated back to the local relay 40A via communication link 156. In this way, the communication link 156 may be of any suitable communicative coupling including any type of wired or wireless routing between the local relay 40A and the remote relay 40B. The circuit breaker 44A of the local relay 40A may be located at a point of common coupling (PCC), for example, between a local microgrid powered by generator 24 and a macrogrid that includes generator 26. A microgrid may be a localized group of electric power sources that may be normally coupled to the macrogrid (e.g., a wide area, synchronous distribution network or grid) but is sometimes operated in an island mode to operate autonomously or independent of the macrogrid. In this way, it may be of particular use to monitor when the local microgrid is synchronous with the macrogrid before closing the circuit breaker 44A of the local relay 40A.

Figure 4:
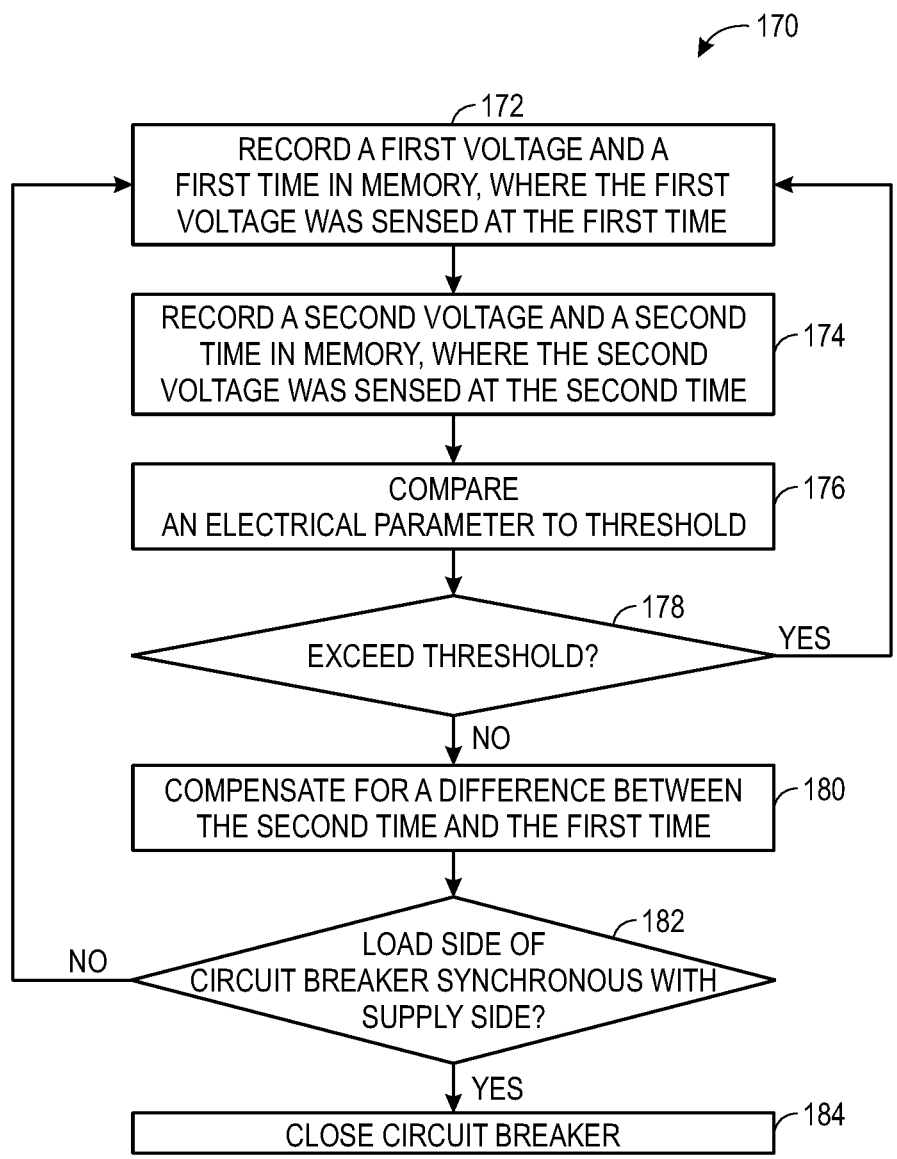
FIG. 4 is a flow diagram of a process for operating the synchronization system of FIG. 3, in accordance with an embodiment.

FIG. 4 is a flow diagram of a process 170 for operating the synchronization system 150 of FIG. 3. The process 170 is described below as being performed by the local relay 40A of FIG. 3. However, it should be understood that the process 170 may be performed by any suitable processing or control circuitry, such as the remote relay 40B or any suitable IED Furthermore, the process 170 is depicted in FIG. 4 as having particular operations described in a particular order. It should be understood that the process 170 may include additional or alternative operations instead of or in addition to the operations depicted in FIG. 4 and that these operations may be performed in other suitable orders.

At block 172, the local relay 40A may record a first voltage and a first time in memory 76, where the first voltage was sensed at the first time. The first voltage may be a voltage obtained via the potential transformer 84E, positioned on a first side (e.g., microgrid side, supply side 64A) of the PCC on the power line energized by the generator 24 while the circuit breaker 44A is open, or otherwise derived from electrical power signals received by the local relay 40A from the potential transformer 132. The first voltage is recorded by the local relay 40A at a particular time based on the common time signal from the time-synchronized clock 152. The particular time is stored in memory 76 as the first time and may be used later as a reference point to determine an amount of delay between electrical power signals corresponding to the local relay 40A and the remote relay 40B (e.g., obtained via the potential transformer 84D at the load side 62B of the remote relay 40B).

The first voltage may be a waveform composed of individual data values received over time via the local relay 40A. In these cases, each of the data values may be individually timestamped (e.g., each data point of the first voltage waveform is individually timestamped). The local relay 40A (or the remote relay 40B in a similar operation to determine a second voltage) may receive the data values corresponding to a voltage difference between a device (e.g., local circuit breaker 44A, remote circuit breaker 44B) and a voltage source or load (e.g., first power generator 24, second power generator 26). The local relay 40A may receive the data values from the potential transformer 84E, and over time generate a representation of the first voltage waveform. In some cases, the local relay 40A may associate one or more timestamps with the waveform. For example, the local relay 40A may record individual timestamps per data value that forms the representation of the first voltage waveform, or may generate a timestamp for the representation of the first voltage waveform indicative of one or more of the individual timestamps of the individual data values and/or of the time of sensing. In some embodiments, the local relay 40A may receive a broadcast of timing information from the time-synchronized clock 152. The local relay 40A may receive an updated time to be associated with the data value as a timestamp of sensing from the remote clock management systems 154 via the time-synchronized clock 152. After the local relay 40A receives the timestamp, the local relay 40A may associate the value (e.g., individual data value, the first voltage waveform) in memory 76 with the timestamp. As mentioned above, the remote relay 40B may perform a similar timestamp association operation in parallel operationally relative to the local relay 40A (e.g., at a substantially similar time or otherwise suitable time).

At block 174, the local relay 40A may record a second voltage and a second time in memory 76, where the second voltage was sensed at the second time. The local relay 40A may receive the second voltage from the remote relay 40B. Similarly to the first voltage, the second voltage may be associated with voltages from a potential transformer 84D proximate to the remote circuit breaker 44B, and thus may indicate a voltage of the power line 22 as detected at the remote relay 40B. Both the first voltage and the second voltage may be determined via any suitable respective method by each relay 40, such that a time is associated with each determined voltage at the end of measurement.

At block 176, the local relay 40A may compare an electrical parameter, such as the first voltage, to one or more thresholds (e.g., threshold amounts). In some cases, both the first voltage and the second voltage are compared to one or more threshold amounts. A threshold amount may be any suitable amount and may be programmed into the local relay 40A. In some cases, the threshold amount is a dynamically set value, such as a value that changes in response to current operating conditions or historically-determined operating conditions. The comparison operations of block 176 may verify that an electrical parameter, such as the first voltage, is within range for one or more frequency values, one or more voltage values, one or more frequency difference values, and/or one or more voltage difference values. The comparison may be performed alongside or in place of other operational condition checks or other monitoring operations of the relay 48.

At block 178, the local relay 40A determines whether the comparison of the first voltage to the threshold amount exceeds a threshold value. The threshold value may be established to determine if the deviance or deviation of the first voltage to the threshold amount is within an acceptable or otherwise desirable range. If the first voltage exceeds the threshold value, the local relay may return to block 172 to record an additional voltage and to repeat the process 170. However, if the comparison or the first voltage does not exceed the threshold value, then the local relay 40A may continue to block 180 to compensate for a difference between the second time and the first time.

At block 180, the local relay 40A may compensate for a difference between the second time and the first time. The local relay 40A may compensate for the difference between the second time and the first time until the difference is zero or within a threshold amount of zero. For example, the local relay 40A may determine how much delay the transmission line incurs into signals sensed by the remote relay 40B and compare present data sensed at the remote relay 40A to earlier sensed data by the local relay 40A to determine when the waveforms are synchronous, therefore "adjusting" the signal to compensate for the time difference. When the time difference between the voltage waveforms sensed by each relay 40 is compensated for, the local relay 40A may determine whether or not the first voltage waveform and the second voltage waveform are suitably aligned to permit closing of the circuit breaker. As a reminder, it may be desired for individual electrical power signal waveforms of each respective bus to be exactly the same or substantially similar (e.g., same within a threshold value) before permitting closing of the local circuit breaker 44A to promote suitable operation upon closing of the circuit breaker. Adjusting voltage waveforms to account for transmission delay (e.g., propagation delay) may enable the comparison between the values to be a "fair" or unbiased comparison.

Thus, at block 182, the local relay 40A may determine whether the load side 62A of the local circuit breaker 44A is synchronous with the supply side 64A of the local circuit breaker 44A. To do so, the local relay 40A may determine whether there is slip between the first voltage waveform and the second voltage waveform. Slip may describe whether or not there is a frequency shift between the first voltage waveform and the second voltage waveform.

In some cases, the local relay 40A may determine whether or not other parameters between the first voltage waveform and the second voltage waveform are suitably similar. For example, it may be desired to close the circuit breaker when the voltage waveforms have a similar amplitude in addition to or instead of having minimal slip between the waveforms. In response to the local relay 40A determining that the load side of the local circuit breaker 44A is not synchronous with the supply side 64A of the local circuit breaker 44A, the local relay 40A may proceed to block 172 to repeat the process 170 to determine another suitable time to close a circuit breaker. In some examples, the local relay 40A may generate an alarm to be displayed via a human machine interface in response to determining that the slip is greater than a first threshold amount used to define slip by a second threshold amount. The second threshold amount may be used to define when an amount of slip may warrant an operator being notified via alarm, or otherwise may warrant a control operation to be performed, such as may be the case with industrial automation systems (e.g., a control operation that receives the alarm as an input, and performs an operation in response to the alarm). However, in response to the local relay 40A determining that the load side of the local circuit breaker 44A is synchronous with the supply side 64A of the local circuit breaker 44A, the local relay 40A may proceed to block 184. At block 184, the local relay 40A may operate to close the local circuit breaker 44A to permit the supply side 64A electrical waveforms to be shared with the load side 62A electrical waveforms.

Figure 5:
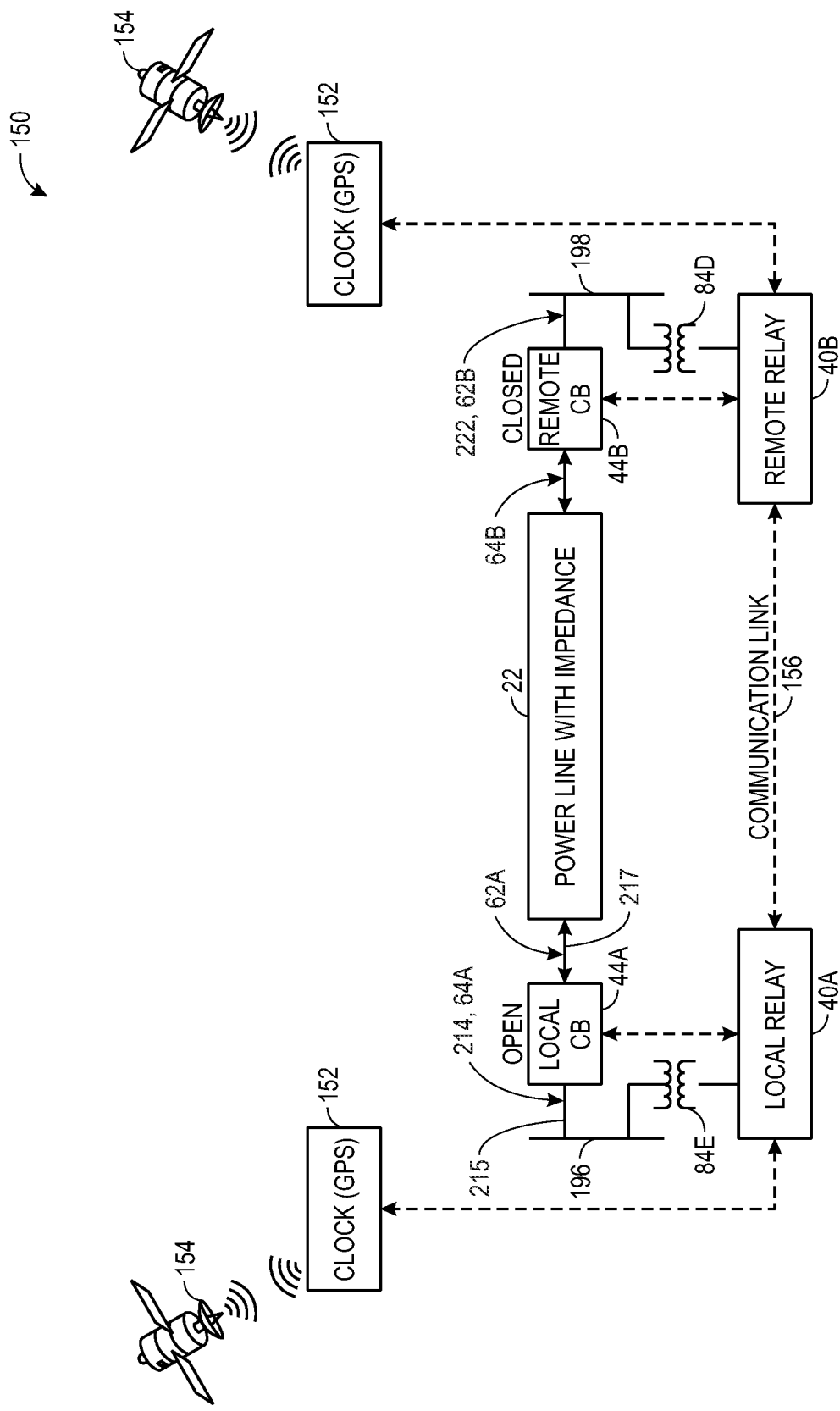
FIG. 5 is a block diagram of an example of the synchronization system of FIG. 3, in accordance with an embodiment.

FIG. 5 is a block diagram of an example synchronization system 150. Many of the same or similar components from FIG. 3 are depicted here, and thus repeated descriptions are relied upon herein. The synchronization system 150 may include a local circuit breaker 44A (e.g., the PCC between a microgrid and a macrogrid) that is open and a remote circuit breaker 44B that is closed. It is noted that the control method described herein may be applied to different circuit breaker 44 configurations, such as when the local circuit breaker 44A is closed and the remote circuit breaker 44B is open. The difference between the control methods may include which electrical waveforms and which electrical waveform parameters are sensed to determine to close the local circuit breaker 44A.

In this example, the local relay 40A may use sensed waveforms and/or sensed waveform parameters from the remote relay 40B to determine when to operate the local circuit breaker 44A to close. When the local circuit breaker 44A closes (and while the remote circuit breaker 44B remains closed), an electrical coupling between a local bus 196 and a remote bus 198 may be formed. In this way, electrical waveforms may transmit between the local bus 196 and the remote bus 198 via the power line 22. It is noted the power line 22 has an impedance. This impedance may be known or determined at a time of installation, and thus may be used to determine when to close the local circuit breaker 44A (e.g., as part of a transmission line impedance determination operation).

Figure 6:
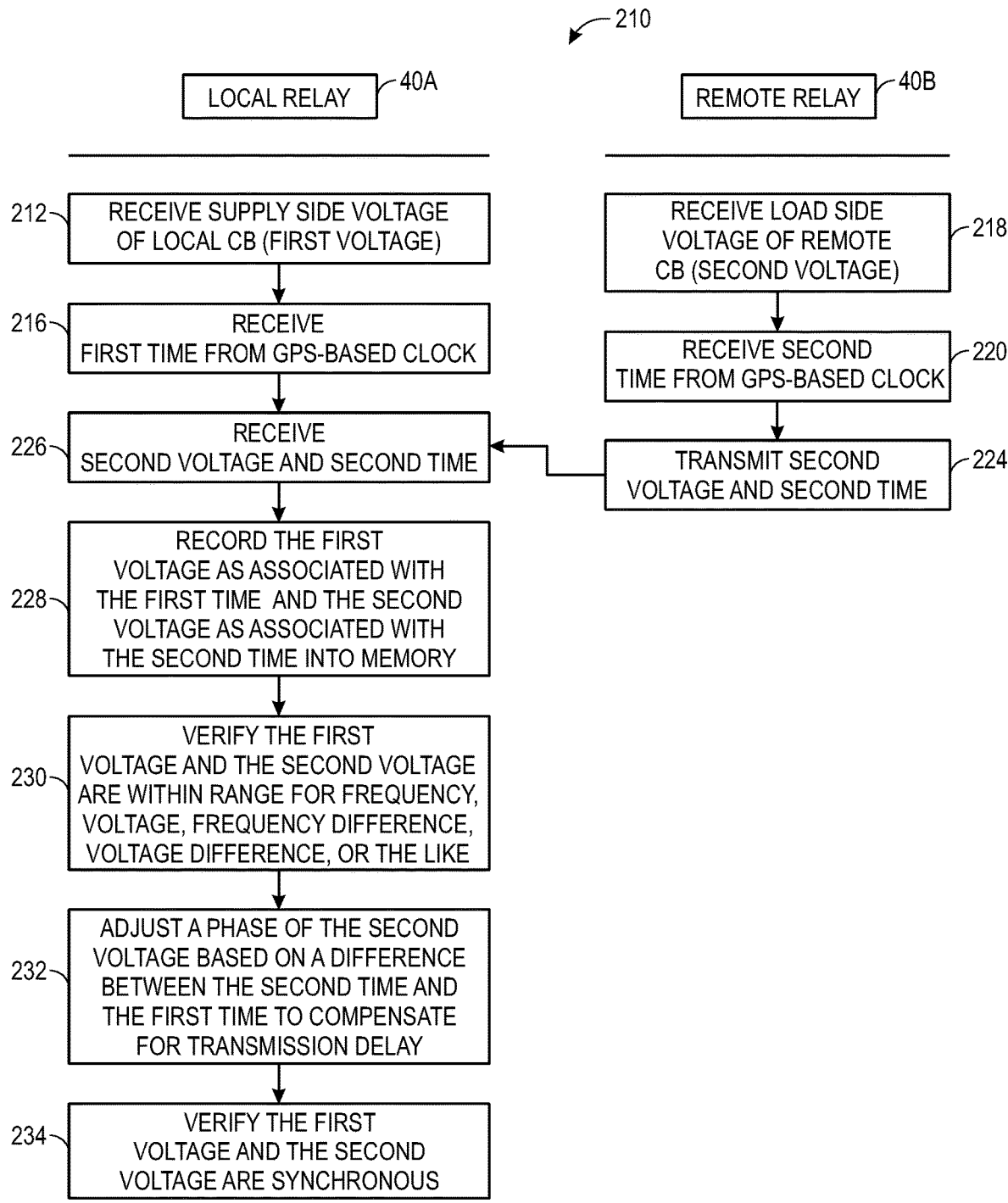
FIG. 6 is a flow diagram of a process for operating the synchronization system of FIG. 5, in accordance with an embodiment.

FIG. 5 may be further explained via FIG. 6. Referring now to FIG. 6, FIG. 6 is a flow diagram of a process 210 for operating the synchronization system 150 of FIG. 5. The process 210 is described below as being performed by the local relay 40A and by the remote relay 40B. However, it should be understood that operations of the process 210 may be performed by any suitable processing or control circuitry, such as the remote relay 40B or any suitable relay of the power delivery system 20. Furthermore, the process 210 is depicted as having particular operations described in a particular order. It should be understood that the process 210 may include additional or alternative operations instead of or in addition to the operations depicted in FIG. 6 and that these operations may be performed in other suitable orders.

At block 212, the local relay 40A may receive a supply side voltage (e.g., supply side 64A) of the local circuit breaker 44A. The supply side voltage may be a sensed voltage, or a data signal proportional to and/or indicative of a voltage transmitted via the supply side 64A of the local circuit breaker 44A. The sensed voltage, for ease of discussion, is referred to as a first voltage 214. The potential transformer 84E may sense the first voltage 214 and transmit the sensed information to the local relay 40A for use in control operations.

At block 216, the local relay 40A may receive a first time from a GPS-based clock. In some embodiments, the local relay 40A may receive broadcasted time information via the time-synchronized clock 152 from the remote clock management systems 154 with a common time source. The time may correspond to a time of sensing of the first voltage 214. This time may be used in combination with a second time of sensing of voltages by the remote relay 40B.

At blocks 218 and 220, the remote relay 40B may repeat operations of block 212 and 216 but for a second voltage 222 indicative of a voltage of the load side 62B of the remote circuit breaker 44B. The operations of blocks 212, 216, 218, 220 may be performed at least partially simultaneously with a subset the operations. For example, the remote relay 40B may determine a time of sensing of the second voltage 222 at least partially simultaneous to sensing of the first voltage 214.

At block 224, the remote relay 40B may transmit the second voltage 222 and the time of sensing of the second voltage 222 to the local relay 40A. At block 226, the local relay 40A may receive the second voltage 222 and the time of sensing of the second voltage 222 from the remote relay 40B. The local relay 40A and the remote relay 40B may be communicatively coupled together via a suitable wired and/or wireless communicative coupling.

At block 228, after having received the first voltage 214, the second voltage 222, and the respective times of sensing of the voltages 214 and 222, the local relay 40A may store the first voltage 214 and the time of sensing of the first voltage 214 into memory 76. The local relay 40A may do the same of the second voltage 222 and the time of sensing of the second voltage 222. These voltages and times may be stored into memory 76 as associated with each other. Any suitable memory and/or storage device may be accessible by or corresponding to the local relay 40A to store and access stored information.

Referring to FIG. 5, electrical characteristics on the first side (e.g., first electrical line 215, supply side 64A) at the potential transformer 84E of the local relay 40A may be independent of electrical characteristics of the second side (e.g., second electrical line 217, load side 62A) at the potential transformer 84D of the remote relay 40B while the local circuit breaker 44A is open. Further, propagation of the electrical signals (e.g., voltages) on the second line 217 from the potential transformer 84E may be delayed due to line impedances of the power line by a time the electrical signals arrive at the remote circuit breaker 44B.

By using the voltages obtained from the remote relay 40B, the local relay 40A may close the circuit breaker 44A when the electrical characteristics of the first side of the power line are synchronized to the second side, without the local relay 40A having an additional potential transformer on the second side (e.g., the second electrical line between local circuit breaker 44A and remote circuit breaker 44B). Further, the local relay 40A may determine whether the first waveform is synchronous with the second waveform on both sides of the local circuit breaker 44A by accounting for propagation delays from line impedances of the power line 22 from the measured voltages of the potential transformer 84D at the remote relay 40B to the local circuit breaker 44A.

At block 230, the local relay 40A may verify that the first voltage 214 and/or the second voltage 222 comply with parameter definitions and/or ranges. In this way, the local relay 40A may verify whether the first voltage 214 and the second voltage 222 are within range for frequency, voltage, frequency difference, voltage difference, or the like, defined parameter ranges. The defined parameter ranges may correspond to ranges of parameters defined to indicate desired or otherwise suitable operation of the synchronization system 150.

At block 232, the local relay 40A, in response to verifying that the first voltage 214 and/or the second voltage 222 are in compliance with the parameter definitions and/or ranges, may adjust a phase of the second voltage 222 based at least in part on a difference between the time of sensing of the second voltage 222 and the time of sensing of the first voltage 214. The phase adjustment performed at block 232 may compensate for transmission delays from at least the power line 22. After compensation for transmission delays, the second voltage 222 represents the voltage at the second side (e.g., load side 62A of the local circuit breaker 44A). The transmission delays may increase based on the impedance of the power line 22 (e.g., higher impedance causes increased delays). In this way, a known impedance of the power line 22 may be used to determine the adjustment to perform to the second voltage 222 to determine the voltage of the second side of the local circuit breaker 44A.

When the second voltage 222 is adjusted to a similar timing as the first voltage 214 to reflect the electrical characteristics of the second side of the local circuit breaker 44A, the local relay 40A may accurately determine whether the first voltage 214 is suitably similar to the second voltage 222 (and thus the local circuit breaker 44A may be closed by the local relay 40A). At block 234, the local relay 40A may close the local circuit breaker 44A in response to determining a phase of the first voltage 214 is within a threshold of a phase of the compensated second voltage 222. When these phases are within a threshold of each other, the first voltage 214 may be said to be synchronous with the second voltage 222, and thus the local circuit breaker 44A may be operated closed.

Thus, technical effects of the present disclosure include systems and methods for determining when waveforms transmitted via two or more buses are synchronous. The systems and methods described here may use sensed waveforms from a remote relay to determine when waveforms of the power delivery system are synchronous, and thus when the local relay may close a circuit breaker. The sensed waveforms may be adjusted to compensate for transmission delays introduced into the electric power delivery system due at least in part to transmission line impedances. The adjustments to the waveforms may be based at least in part on clocking or time signals from a remote clock management system. The remote clock management system may remotely track a time, such as based on GPS or location information, and provide an accurate time reference that may be substantially independent of signal delay within the power delivery system. Furthermore, these systems and methods may help monitor three phases of the power delivery system, instead of just a single phase of the power delivery system. In this way, less equipment may be installed to determine when two waveforms are synchronous and suitable for joining (e.g., by closing a breaker). These improved methods may improve power transmission system operation by enabling control and/or protection circuitry to operate in a more efficient manner (e.g., when the baseline frequency measurement is improved and/or more efficient). This may improve a response of the power transmission system to a fault condition, or other abnormal operation.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
a circuit breaker (CB) configured to be coupled between a first electrical line and a second electrical line; and
a first intelligent electronic device (IED) configured to:
receive a representation of a first waveform corresponding to a first electrical signal measured on a first side of the circuit breaker while the circuit breaker is open, wherein the representation of the first waveform comprises a first timestamp corresponding to a first time of sensing of the first waveform;
receive a representation of a second waveform corresponding to a second electrical signal measured on a second side of the circuit breaker while the circuit breaker is open, wherein the representation of the second waveform comprises a second timestamp corresponding to a second time of sensing of the second waveform;
adjust a phase of the second waveform based at least in part on a comparison between the first timestamp and the second timestamp to obtain a phase-adjusted second waveform;
determine whether the first waveform is synchronous with the phase-adjusted second waveform; and
close the circuit breaker in response to determining the first waveform is synchronous with the phase-adjusted second waveform, wherein the circuit breaker closing couples the first electrical line to the second electrical line.

2. The system of claim 1, wherein the first waveform comprises a sinusoidal voltage signal associated with power transmission.

3. The system of claim 1, wherein the first device comprises a circuit breaker that opens or closes in response to a signal from the first relay.

4. The system of claim 1, wherein the first relay is configured to:
receive the clock signal from a clock management system;
determine the first time based at least in part on the clock signal; and
store the first time with the representation of the first waveform into a memory as the first timestamp.

5. The system of claim 4, wherein the first relay is configured to:
determine a phase of the representation of the first waveform and a phase of the representation of the phase-adjusted second waveform; and
compare the adjusted phase of the representation of the phase-adjusted second waveform to the determined phase of the representation of the first waveform to determine whether the first waveform is synchronous with the phase-adjusted second waveform.

6. The system of claim 1, wherein the first relay is configured to determine whether the first waveform is synchronous with the second waveform based at least in part on an electrical line impedance determination operation.

7. The system of claim 1, comprising:
a second relay communicatively coupled to the first relay, wherein the second relay configured to operate the second device independently of the first relay.

8. The system of claim 7, wherein the second device is configured to couple between the first electrical line and the second electrical line, wherein the second relay is configured to receive a first time broadcasted by a clock management system and generate the second timestamp from the first time, and wherein the first relay is configured to:
receive, from the second relay, the representation of the second waveform;
receive, from the clock management system, a second time;
store the first time with the representation of the first waveform into a memory as the first timestamp;
determine a difference in time between the first timestamp and the second timestamp; and
adjust the representation of the second waveform based at least in part on the difference in time.

9. The system of claim 8, wherein the clock management system comprises a global positioning system such that the first time is derived from one or more signals of the global positioning system.

10. The system of claim 8, wherein the first relay is configured to receive the first time from the clock management system via a wireless communicative coupling.

11. A method, comprising:
receiving a representation of a first waveform corresponding to a first device on a first electrical line on a first side of the first device;
receiving a representation of a second waveform corresponding to a second device disposed at a remote location relative to the first device on a second electrical line on a second side of the first device;
adjusting a phase of the second waveform based at least in part on a comparison of delay between measurement times of the representation of the first waveform and the representation of the second waveform to obtain a phase-adjusted second waveform;
determining whether the first waveform is synchronous with the phase-adjusted second waveform; and
actuating the first device in response to determining the first waveform is synchronous with the phase-adjusted second waveform.

12. The method of claim 11, comprising:
receiving a time broadcasted from a clock management system, wherein the phase of the second waveform is adjusted based at least in part on the time;
determining a phase of the representation of the first waveform and a phase of the phase-adjusted second waveform; and
comparing the phase of the phase-adjusted second waveform to the determined phase of the representation of the first waveform to determine whether the first waveform is synchronous with the phase-adjusted second waveform.

13. The method of claim 11, comprising:
receiving a first time associated with the representation of the first waveform; and
storing in memory the first time such that the first time is associated with the representation of the first waveform in the memory.

14. A tangible, non-transitory, computer-readable medium comprising instructions that, when executed by a processor, cause the processor to:
receive a measurement of a first waveform on a first electrical line on a first side of an open circuit breaker;
receive a measurement of a second waveform on a second electrical line on a second side of the open circuit breaker;
adjust a phase of the second waveform to obtain a phase-adjusted second waveform to compensate for transmission delays; and
determine whether the first waveform is synchronous with the phase-adjusted second waveform; and
actuate the circuit breaker in response to determining that the first waveform is synchronous with the phase-adjusted second waveform.

15. The computer-readable medium of claim 14, comprising instructions that cause the processor to:
receive a representation of a first voltage difference between a local relay and the circuit breaker;
receive a representation of a second voltage difference between a remote relay and a remote circuit breaker;
receive a first time corresponding to a time of sensing of the first voltage difference; and
receive a second time corresponding to a time of sensing of the second voltage difference.

16. The computer-readable medium of claim 15, comprising instructions that cause the processor to:
transmit a signal to poll a clock management system for a clock signal determined based at least in part on a global positioning system signal;
receive the clock signal; and
compare the representation of the second waveform to the representation of the first waveform after adjusting the representation of the second waveform based at least in part on the clock signal.

17. The computer-readable medium of claim 15, comprising instructions that cause the processor to:
determine a difference between the first time and the second time;
adjust the representation of the second voltage difference based at least in part on the difference between the first time and the second time; and
compare the adjusted representation of the second voltage difference and the representation of the first voltage difference to determine a slip.

18. The computer-readable medium of claim 17, comprising instructions that cause the processor to:
determine whether the slip is greater than a threshold amount, wherein when the slip is less than or equal to the threshold amount, the first voltage difference and the second voltage difference comprise synchronous waveforms; and
operate the local relay to close the circuit breaker in response to determining that the slip is not greater than the threshold amount.

19. The computer-readable medium of claim 17, comprising instructions that cause the processor to:
determine whether the slip is greater than a first threshold amount, wherein when the slip is less than or equal to the first threshold amount, the first voltage difference and the second voltage difference comprise synchronous waveforms; and
generate an alarm to be displayed via a human machine interface in response to determining that the slip is greater than the first threshold amount by a second threshold amount.

* * * * *